United States Patent
Faber (12)

(10) Patent No.: US 6,253,880 B1
(45) Date of Patent: Jul. 3, 2001

(54) WHEEL CHAIR RATCHET BRAKE

(75) Inventor: Wade Anthony Faber, Junction City, OR (US)

(73) Assignee: Wade A. Faber, Junction City, OR (US)

( * ) Notice: Subject to any disclaimer, the term of this patent is extended or adjusted under 35 U.S.C. 154(b) by 0 days.

(21) Appl. No.: 09/655,419

(22) Filed: Sep. 5, 2000

(51) Int. Cl.[7] ................... B60T 1/04; B60T 1/02
(52) U.S. Cl. ......................... 188/2 F; 280/250.1
(58) Field of Search .................. 188/2 F, 24.18, 188/30

(56) References Cited

U.S. PATENT DOCUMENTS

| | | | | |
|---|---|---|---|---|
| 4,641,847 | * | 2/1987 | Busse | 280/242 |
| 4,733,755 | * | 3/1988 | Manning | 188/2 F |
| 4,887,830 | * | 12/1989 | Fought | 280/304.1 |
| 4,987,978 | * | 1/1991 | Jungersen | 188/2 F |
| 5,197,750 | * | 3/1993 | DiGeorge | 280/250.1 |
| 5,211,414 | * | 5/1993 | Galumbeck | 280/250.1 |
| 5,743,544 | * | 4/1998 | Weaver | 280/249 |
| 5,845,746 | * | 12/1998 | Henrickson | 188/2 F |

FOREIGN PATENT DOCUMENTS

| 2110780 | * | 6/1983 | (GB) . |
|---|---|---|---|
| 9815249 | * | 4/1998 | (WO) . |

* cited by examiner

*Primary Examiner*—J. J. Swann
*Assistant Examiner*—David Divine

(57) ABSTRACT

A ratchet brake for a wheelchair of the type comprising a frame, a seat member, a back member, two arm-rest members, at least one wheel. The ratchet brake mounted to the frame for limiting the at least one wheel to forward rotation upon actuation by the user. Wherein the ratchet brake comprises a lever handle engaged with the brake for actuation, an actuating pin that prevents rotation of the ratchet gear in a direction associated with rearward movement of the wheelchair, a cylindrical ratchet gear having a rounded outer surface engaging the outer surface of the wheel and a toothed inner surface engaging the actuating pin, an axle supporting the ratchet gear for rotation, and a linkage operably connecting the handle to the ratchet gear supporting axle.

1 Claim, 3 Drawing Sheets

WHEEL CHAIR RATCHET BRAKE

CROSS-REFERENCE TO RELATED APPLICATIONS

Not Applicable

REFERENCE TO A MICROFICHE APPENDIX

Not Applicable

STATEMENT REGARDING FEDERALLY SPONSORED RESEARCH OR DEVELOPMENT

Not Applicable

BACKGROUND OF THE INVENTION

The "ratchet brake" is a mechanical device to be used on wheel chairs; it is a ratcheting gear attached to the end of a wheel chair brake. The purpose being so that when the brake of the chair is applied the user will then be assisted in going up hills and ramps. Without the ratchet brake much physical strength is needed to keep the chair from rolling backwards.

SUMMARY OF THE INVENTION

The "Ratchet Brake" when mounted on a wheel chair brake will allow only forward movement of the chair while the brake is applied. People with limited upper-body strength would then be able to negotiate ramps and hills with much greater ease.

DESCRIPTION OF THE DRAWING

Figure One

Figure one shows "Ratchet Brake", a wheel chair brake with the ratchet gear installed, as a detail. Shown in relationship to the brake are also a portion of the chair frame and a portion of the wheel.

Item A

Figure 1:
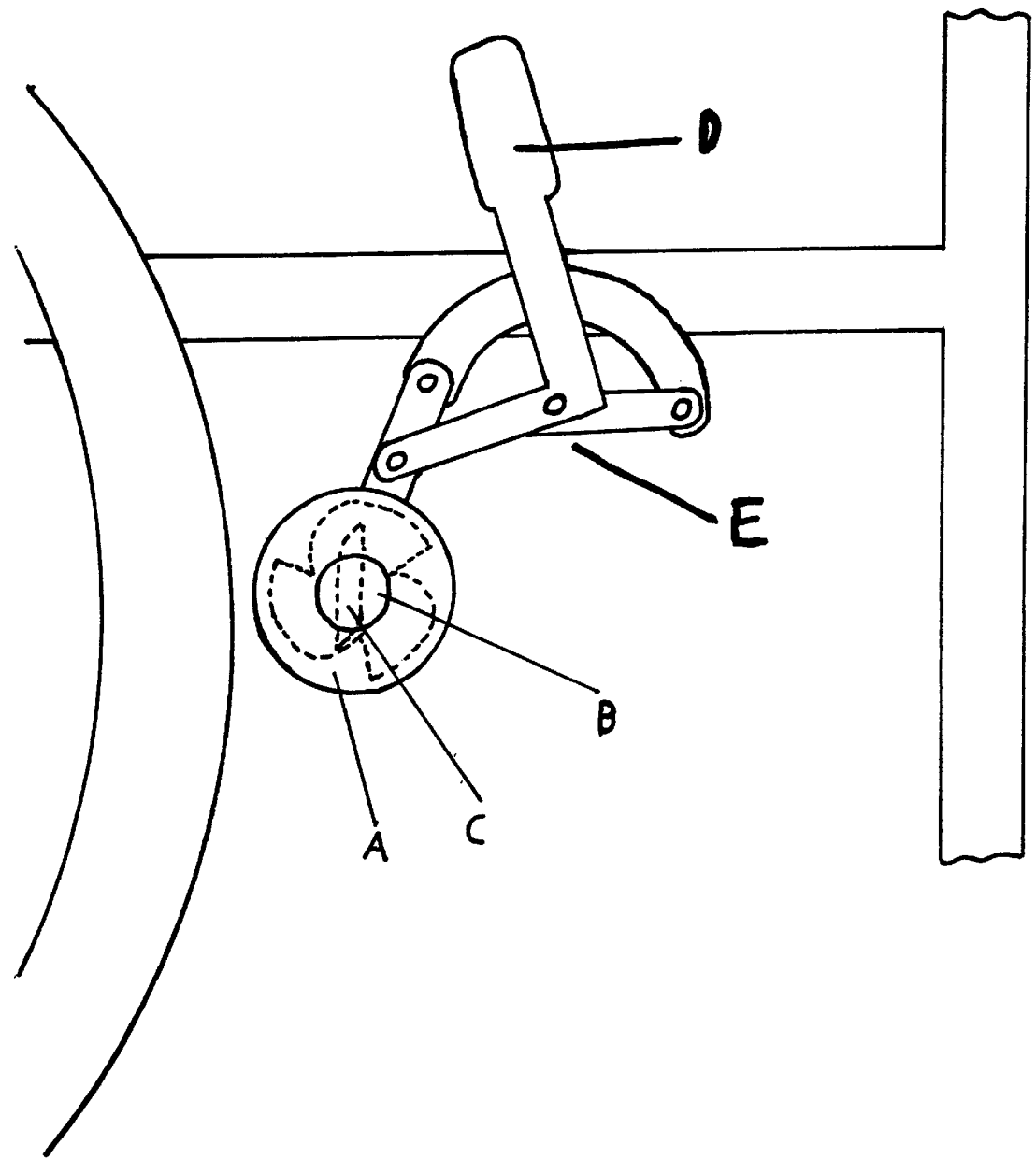
Figure 2:
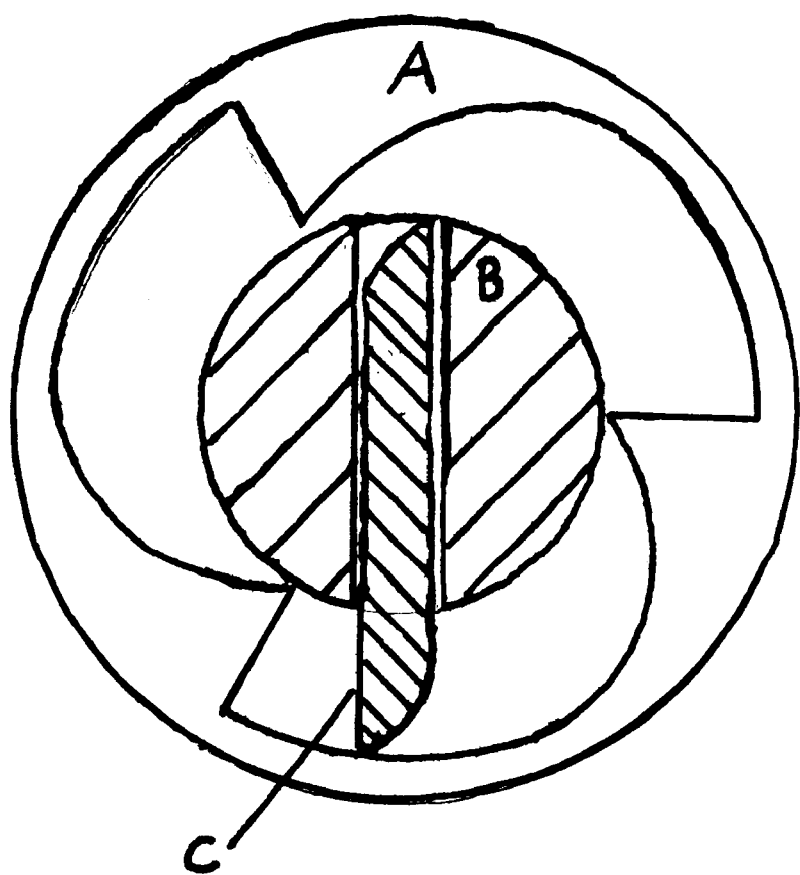
Figure 3:
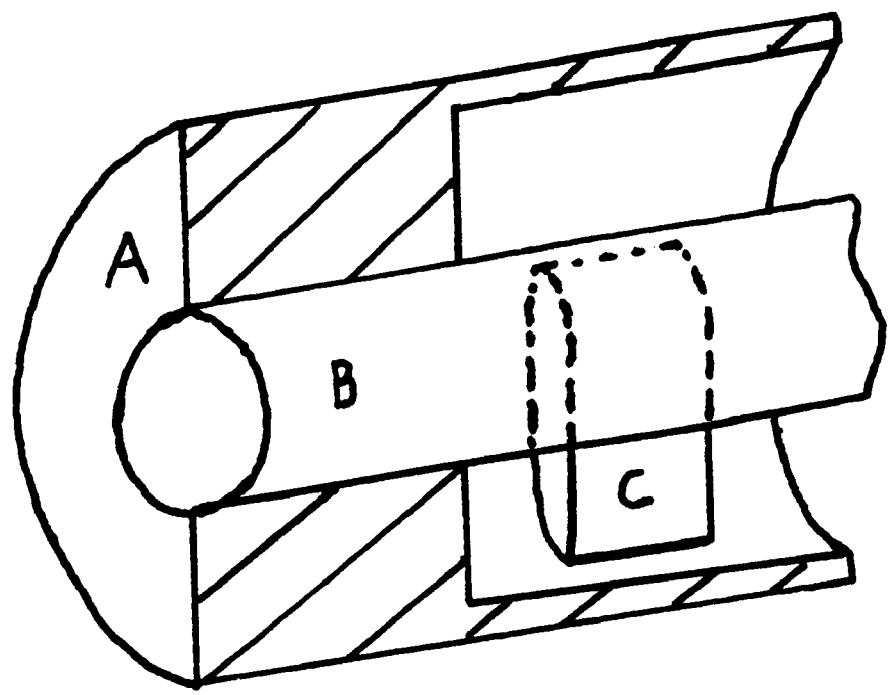

Shown is the single direction or ratcheting gear. Shown hidden from view are the ramped teeth witch allow for forward motion.

Item B

Show in an end view is the shaft or axle the gear rides on.

Item C

Shown as hidden from view is the gravity actuated pin which stops the outer gear from spinning backward.

Item D—Shown is a lever handle to activate the brake.

Item E—Shown is a linkage mechanism connecting the handle to the ratchet gear.

Figure Two

Shown is an inside to outside view with axle and pin cut-away

Item A shown in full view, the outer directional gear

Item B shown cut-away, axle with slot for actuating pin exposed

Item C shown cut-away the actuating pin

Figure Three—End view from the outer end and slightly to one side.

Item A—Cut away of the outer directional gear.

Item B—Full view, portion of axle which directional gear rides on.

Item C—Shown partially hidden from view, the actuating pin.

DESCRIPTION OF THE INVENTION

The "Ratchet Brake" is very simply the combination of a standard wheel chair brake and a single direction gear. The portion of the brake which contacts the tire is replaced with a short shaft or axle (B). Mounted on the axle is a single direction gear (A). The gear is driven into motion by friction with the wheel chair tire. A gravity actuated pin (C) is mounted piercing the axle so that it contacts the gear to limit the direction of motion of the gear.

The parts are made with no special means or processes and can be produced in any machine shop. Steel should be the preference of materials, but some parts could be made from plastic; all parts would be machined and or cast in a mold.

The use and operation of a "Ratchet Brake" is as simple as using any standard wheel chair brake. Simply push the handle (D) of the brake and the linkage (E) pushes the gear against the wheel of the chair. The gear then only allows forward motion thus assisting the user in negotiating inclined surfaces.

However a locking device can and should be installed to prevent forward motion, except when it is desirable. The prototype is simply drilled through the outer gear and axle with a removable pin placed in that hole.

What is claimed is:

1. A wheelchair of the type comprising a frame, a seat member, a back member, two arm-rest members, at least one wheel, a ratchet brake mounted to the member for limiting the at least one wheel to forward rotation upon actuation by the user; the ratchet brake comprising a lever handle engaged with the brake for actuation, an actuating pin that prevents rotation of the ratchet gear in a direction associated with rearward movement of the wheelchair, a cylindrical ratchet gear having a rounded outer surface engaging the outer surface of the wheel and a toothed inner surface engaging the actuating pin, an axle supporting the ratchet gear for rotation, and a linkage operably connecting said handle to said ratchet gear supporting axle.

* * * * *